Jan. 23, 1962 R. L. GAMAUNT 3,017,942
TRACK LAYING VEHICLE
Filed Aug. 25, 1958 3 Sheets-Sheet 1

ROGER L. GAMAUNT
INVENTOR.

BY Thomas P. Mahoney

ATTORNEY.

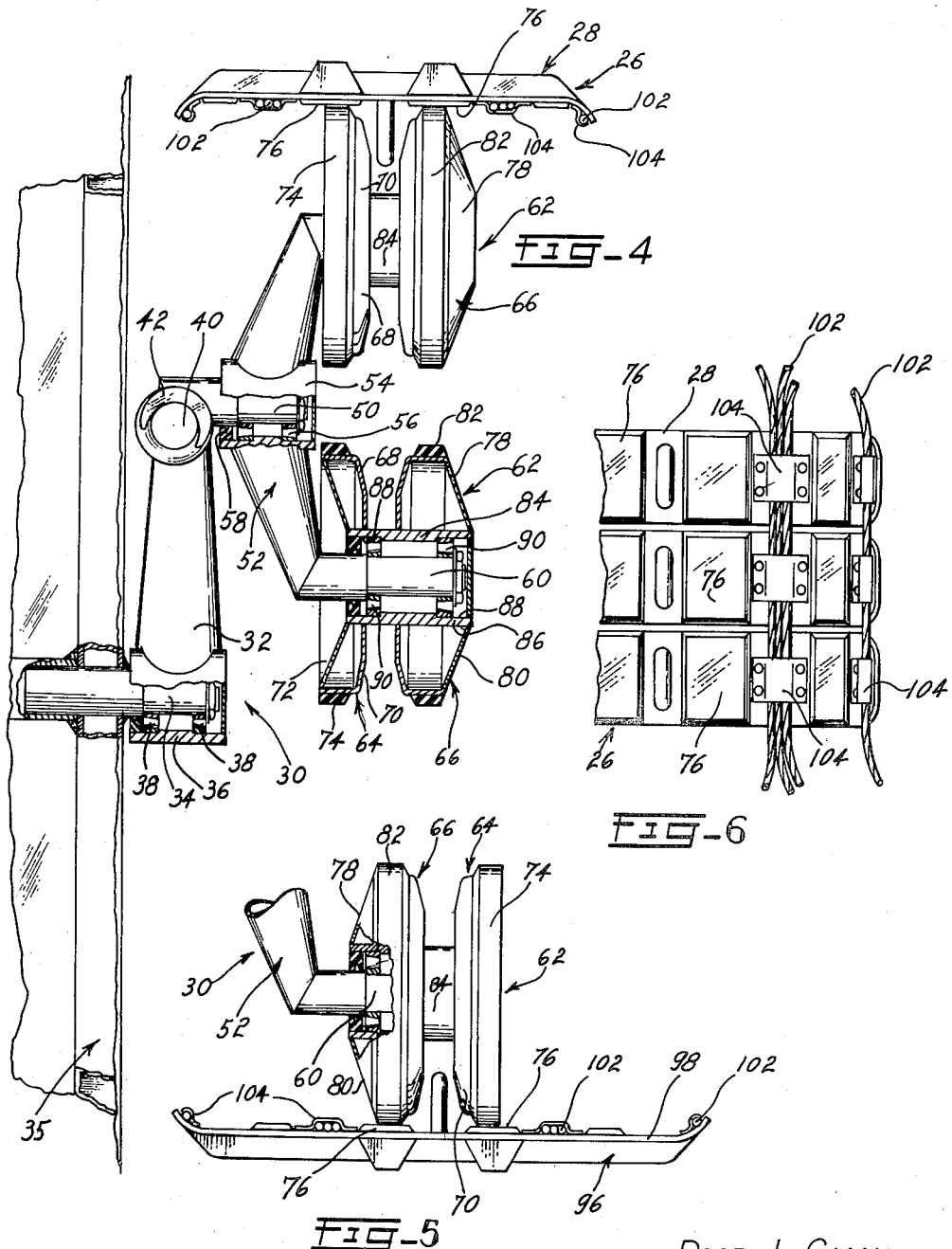

Jan. 23, 1962  R. L. GAMAUNT  3,017,942
TRACK LAYING VEHICLE
Filed Aug. 25, 1958  3 Sheets-Sheet 3
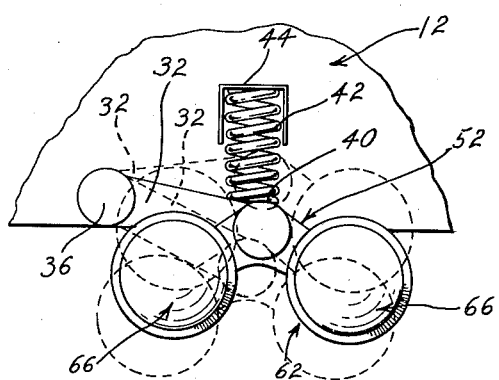
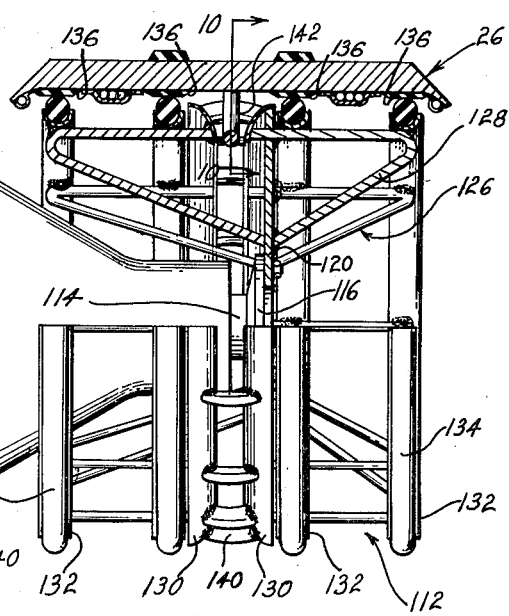
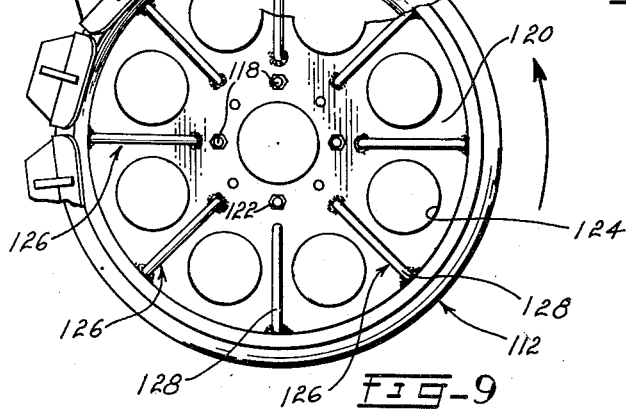
ROGER L. GAMAUNT
INVENTOR.
BY Thomas P. Mahoney
ATTORNEY

United States Patent Office 3,017,942
Patented Jan. 23, 1962

3,017,942
TRACK LAYING VEHICLE
Roger L. Gamaunt, P.O. Box 55, Fawnskin, Calif.
Filed Aug. 25, 1958, Ser. No. 757,074
2 Claims. (Cl. 180—9.2)

This invention relates to a track laying vehicle and, more particularly, to a track laying vehicle adapted to be utilized as an amphibious combat vehicle.

One of the greatest problems encountered in conventional track laying vehicles is the fact that the bogie wheel suspensions for the tracks of such vehicles will permit the dislodgement of the track from operative engagement with the bogie wheels and with the driving and guiding sprockets therefor, thus incapacitating the vehicle for further operation until the track has been re-aligned on the bogie wheels. Of course, such dislodgement of the track under combat conditions can result in loss of life to the occupants of the vehicle and the destruction of the vehicle.

It is, therefore, an object of my invention to provide a track laying vehicle which includes a track engaging and aligning suspension system which effectively resists displacement of the track from operative engagement with the bogie wheels and the guide and driving sprockets for the track.

An additional object of my invention is the provision of a suspension system for a track laying vehicle wherein the bogie wheels engage the track with which they are associated with substantially equal pressure along the length of the track, thus preventing inequalities in the pressure applied thereto from permitting dislodgement of the track from operative engagement with said bogie wheels.

Another object of my invention is the provision of a suspension system for a track laying vehicle wherein the compressive loads applied to the bogie wheels and the mounting arms therefor are such that the displacement of the bogie wheels and mounting arms for said wheels in an upward direction does not release the track from operative engagement with the bogie wheels since the associated bogie wheels and bogie wheel mounting arms accommodate for such upward displacement of the bogie wheels and mounting arms therefor.

Another problem encountered in conventional track suspension systems for track laying vehicles is the wedging of debris such as rocks, tree limbs, and the like, in the suspension system, thus causing displacement of the track from the suspension system or so wedging the suspension system against the track that further movement of the track on the suspension system by the drive sprockets therefor is prevented.

A further object of my invention is the provision of a suspension system for a track laying vehicle wherein the component parts of the suspension system are so constructed and affixed in operative engagement with the body of the vehicle with which they are associated that the suspension system component parts tend to be self-clearing and to resist the accumulation of debris which would cause the locking of the suspension system component parts or the displacement of the track from operative engagement therewith.

Combat vehicles of the character under consideration here are most frequently utilized in snow conditions, such as light powder snow, wherein the necessity for the application of a wider track than the conventional track arises in order that the vehicle will not bog down in the light powder snow. With conventional vehicles, the installation of a wider track involves the major overhaul of the suspension system since the component parts utilized with the conventional width track are not adaptable for use with the wider track.

Another object of my invention is the provision of a suspension system for a track laying vehicle wherein the component parts of the suspension system can be utilized with tracks of different widths and thus, by the simple expedient of removing the smaller width track and reversing the bogie wheels of the suspension system, the larger track can be installed in operative relationship with the suspension system.

Another object of my invention is the provision of a suspension system for track laying vehicles wherein the bogie wheels are reversible on the bogie arms which mount the same, reversal of the bogie wheels permitting the treads thereof to be spaced a greater distance laterally of the bogie arms therefor in order that a wider track may be accommodated thereupon.

Another difficulty frequently encountered and resulting in the immobilization of conventional track laying vehicles is the fact that mud, ice, snow, and other debris become engaged in and locked upon the conventional drive and guide sprockets of such conventional track laying vehicles, resulting in either the immobilization of the vehicle or the dislodgement of the track from operative engagement wtih the sprockets thereof.

An additional object of my invention is the provision of a sprocket construction for utilization in conjunction with the track of a track laying vehicle which effectively resists the accumultaion of mud, snow, or ice and which is essentially self-clearing in construction whereby the rotation of the sprockets will cause debris, mud and/or snow accumulating therein to be immediately discharged therefrom.

Another object of my invention is the provision of a sprocket construction of the aforementioned character wherein the sprocket consists of a plurality of concentrically mounted rings, the open nature of which prevents the accumulation of ice, mud, and/or other material in the sprocket and thus eliminates the possibility of immobilization of the vehicle because of the accumulation of such materials therein.

A further object of my invention is the provision of a combat vehicle of the track laying type which is characterized by its extremely low silhouette and the manner in which it will fleetly maneuver.

Other objects and advantages of my invention will be apparent from the following specification and the accompanying drawings which are for the purpose of illustration only and in which:

FIG. 4 is an enlarged, fragmentary sectional view showing a portion of the track suspension system of my invention;

FIG. 5 is a fragmentary, sectional view showing the manner in which the track suspension system of my invention can be adapted for use with wider tracks, when necessary;

FIG. 6 is an enlarged, fargmentary top plan view showing the construction of the track utilized in the combat vehicle of my invention;

FIG. 7 is a fragmentary, side elevational view showing the manner in which the track suspension system of the combat vehicle operates;

FIG. 8 is a partly sectional view of the drive sprocket construction incorporated in the combat vehicle of my invention; and FIG. 9 is a vertical, sectional view taken on the broken line 10—10 of FIG. 8.

Figure 1:
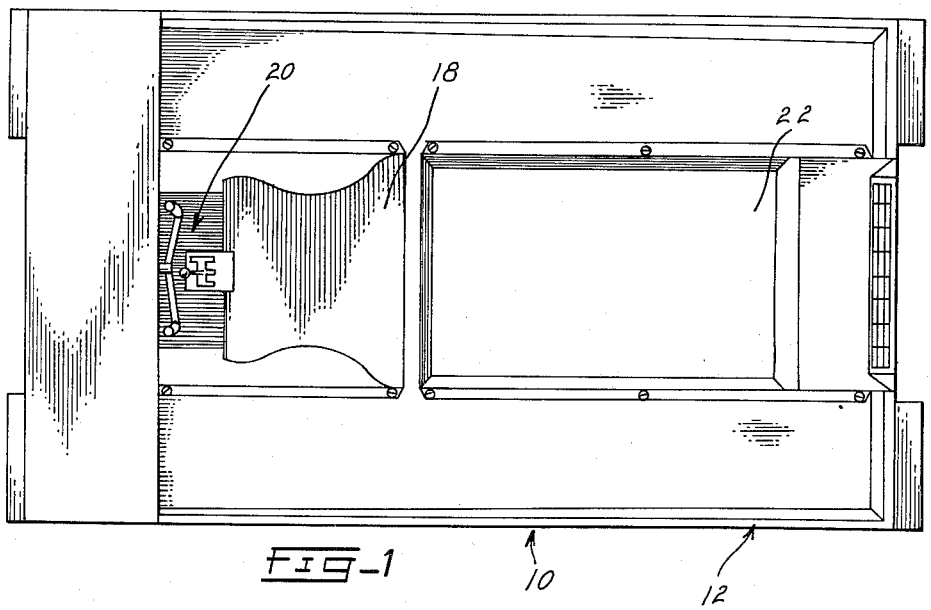
FIG. 1 is a top plan view of a track laying combat vehicle constructed in accordance with the teachings of my invention.

Referring to the drawings and particularly to FIGS.

1-3 thereof, I show a track laying combat vehicle 10 constructed in accordance with the teachings of my invention. While the teachings of my invention are illustrated as incorporated in a combat vehicle, it is, of course, to be understood that the principles thereof may be applied with equal cogency to various types of track laying vehicles and it is not intended that the principles of the invention be limited in their application to the specific type of vehicle described herein and shown in the accompanying drawings.

The vehicle 10 includes an elongated, substantially rectangular body 12 which is formed, by welding or other conventional expedients, from sheet steel and which has two laterally extending side portions 14 and an intermediate, depending portion 16. Located in the intermediate portion of the body 12 are the driver's seat 18, the driving and motor controls indicated generally at 20, and the motor enclosure 22.

The vehicle 10 is supported upon and moved by a pair of tracks 26 constituted by a plurality of interconnected cleats 28 whose construction will be described in greater detail below. The tracks 26 are supported on track suspension and alignment systems on each side of the body 12 of the vehicle 10 and each suspension system, indicated generally at 30, includes a plurality of trailing suspension arms 32 which are mounted at their forward extremities upon laterally extending studs 34 whose inner extremities are supported on longitudinal frame members 35 within the body 12 of the vehicle 10, as best shown in FIG. 4 of the drawings. The inner extremities of the studs 34 are supported in tubular sockets secured to the frame members 35.

Figure 2:
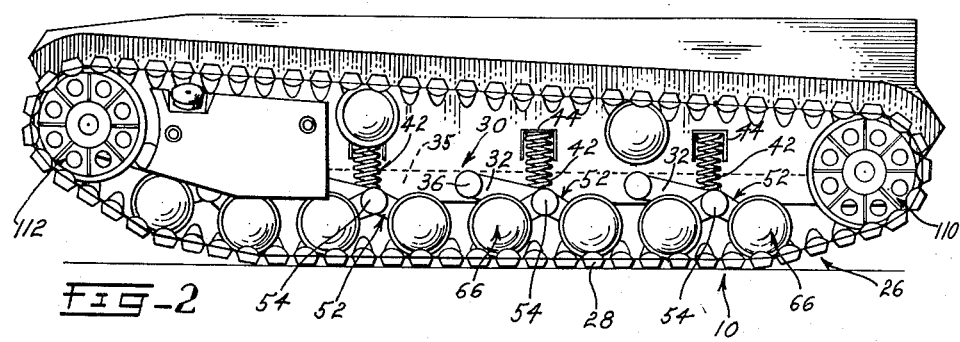
FIG. 2 is a side elevational view of the combat vehicle.
Figure 3:
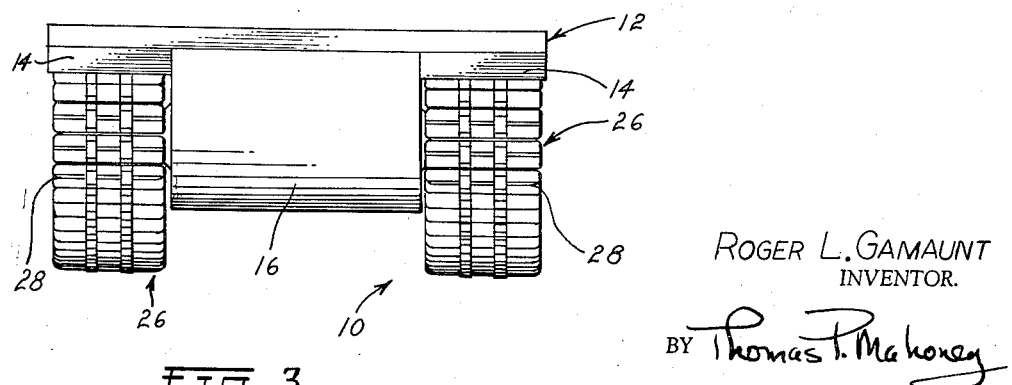
FIG. 3 is a front elevational view thereof.

The forward extremities of the trailing suspension arms 32 each include a mounting boss 36 incorporating roller bearings 38 engageable with the periphery of the mounting studs 34 whereby the trailing suspension arms 32 may pivot with respect to the body 12 of the vehicle 10. The rearward extremity of each of the trailing suspension arms 32 is provided with an upwardly directed projection 40 which constitutes, as best shown in FIGS. 2 and 4 of the drawings, a seat for the lower extremity of a compression spring 42 whose upper extremity is received in a seat 44 mounted on the side of the body 12 of the vehicle 10.

While I have disclosed the compression or shock absorbing means of the suspension system 30 as including a spring 42, other types of shock absorbing means such as hydraulic cylinders and the like may be substituted therefor without materially altering the manner in which the suspension system 30 of my invention operates.

It will be noted, however, that the spring forces exerted by the springs 42 upon the trailing arms 32 are, as best shown in FIG. 7 of the drawings, applied in a straight, vertical line to the rearward extremity of each of the trailing arms 32. Therefore, as the suspension arm 32 is moved up and down when the track 26 encounters various obstacles in its path, the compression of the spring 42 does not cause lateral displacement of the suspension arm 32 and thus maintains the portion of the track 26 being deflected upwardly or downwardly in corresponding alignment with the remainder of the track.

Each of the trailing suspension arms 32 includes a laterally extending axle or shaft 50, as best shown in FIG. 4 of the drawings, which is mounted immediately below the spring seat constituted by the upwardly oriented projection 40 on said trailing arm and a bogie supporting arm 52 is mounted thereupon intermediate its forward and rearward extremities. Each bogie supporting arm 52 includes a centrally located mounting portion 54 in which are located roller bearings 56 interposed between the interior of said mounting portion 54 and the periphery of the shaft 50. Also mounted in the mounting portion 54 is a seal 58 adapted to prevent ingress of dirt and moisture into the interior of the mounting portion 54 and into engagement with the bearings 56.

The forward and rearward extremities of the bogie mounting arms 52 have laterally extending axles 60 provided thereupon which serve to mount bogie wheel assemblies 62, each constituted by a pair of dissimilar bogie wheels 64 and 66, respectively.

The bogie wheel 64 includes a wheel body 68 having a cup-shaped shell 70 and a frusto-conical reinforcing disc 72 welded to said shell. A rubber tire 74 constituting the tread of the wheel 64 is mounted upon the perimeter of the shell 70 and is adapted to engage corresponding rubber pads 76 on successive cleats 28 of the track 26.

The body 78 of the wheel 66 is considerably wider than the body 68 of the bogie wheel 64 and is defined by a hollow steel shell 80 upon the perimeter of which is mounted a tire 82 adapted to engage corresponding rubber pads 76 on successive cleats 28 of the track 26. The bogie wheels 64 and 66 are secured to a common mounting member or shaft 84 which, as best shown in FIGS. 4 and 5 of the drawings, is constituted by a hollow shell 86 having bearing receptacles 88 at its opposite extremities for the reception of roller bearings 90 which engage the periphery of the axle 60 and serve to permit rotation of the bogie wheels 64 and 66 with respect to said axle.

In considering further the specific configuration of the bogie wheels 64 and 66, it will be noted that the wheel 64, which is normally disposed adjacent the bogie support arm 52 when a normal sized, fourteen inch track 26 is utilized, has a relatively flat vertical edge at the lefthand side thereof as viewed in FIG. 4 of the drawings and thus can be disposed in close proximity to the support arm 52 to permit the treads of the wheels 64 and 66 constituted by the tires 74 and 82 to engage corresponding rubber pads 76 on the successive cleats 28 of the track 26. It will also be noted that the bogie wheel 64 is so mounted upon the shell 86 constituting the shaft 84 that the greater portion of its width extends beyond the associated extremity of the shaft 84, whereas the complete width of the bogie wheel 66 is mounted in overlying relationship with the associated extremity of the shaft 84.

Therefore, when the substitution of an eighteen inch track 96, best shown in FIG. 5 of the drawings, for the fourteen inch track shown in FIG. 4 of the drawings becomes necessary because of snow conditions or other factors, the track 26 can be removed from operative relationship with the bogie wheels 64 and 66. The shaft 84 is then removed from operative relationship with the associated axle 60 and the position of the bogie wheels with reference to the shaft reversed to locate the bogie wheels 64 and 66 in the positions shown in FIG. 5 of the drawings. When located in the reversed positions, the treads constituted by the tires 82 and 74 of the bogie wheels 64 and 66, respectively, are displaced to the right so that they may engage the corresponding pads 76 on the cleats 98 of the wider track 96. In this manner, the necessity for the provision of bogie wheels of different dimensions to accommodate the wider track 96 is eliminated and considerably greater flexibility of the combat vehicle 10 is achieved.

Both the track 26 and the track 96 have the cleats 28 and 98 thereof maintained in operative relationship with each other by lengths of steel cable 102 which are fastened in clips 104, thus securing the cleats 28 and 98 to create a continuous track for support on the suspension system 30.

Mounted in operative relationship with the vehicle 10 and constituting a part of the track suspension system 30 are guide sprockets 110 and driving sprockets 112 which are of identical configuration with the exception that the driving sprockets 112 are operatively secured upon a drive shaft 114, as best shown in FIGS. 2, 8 and 9 of the drawings. Since the guide and driving sprockets 110 and 112, respectively, are of identical configuration, only the driving sprocket 112 will be described herein.

The outermost extremity of the drive shaft 114 is, as best shown in FIG. 8 of the drawings, provided with an enlarged mounting portion 116 and incorporates a plurality of threaded studs 118 for the reception of correspondingly sized and shaped openings in a hub or mounting plate 120. The hub plate 120 is maintained in operative engagement with the drive shaft 114 by means of nuts 122 and incorporates a plurality of enlarged openings 124.

Welded to the opposite surfaces of the hub plate 120 is a plurality of cantilever supporting members 126 constituted by substantially V-shaped rods 128 whose lower extremities are welded to the associated surface of the hub plate 120. The cantilever supports 126 have a plurality of concentrically oriented rings 130 and 132 welded thereto, the rings 132 being of semi-circular cross section and supporting tires 134 adapted to engage corresponding rubber pads 136 on the track 26.

It will be noted that the cantilever supports 126 extend through the completely open rings 132 and that the V-shaped configuration of the supports 126 as constituted by the V-shaped rods 128 provides a substantially open structure, for a purpose which will be described in greater detail below.

The rings 130 are disposed in contiguity to each other and constitute the innermost of the plurality of rings. Unlike the rings 132, they do not engage a corresponding surface on the track 26, but are supported by securement to the outer extremities of the upper legs of the cantilever support 126 in juxtaposition to each other. Welded or otherwise secured between the legs 130 are sprocket dogs or teeth 140 which, as best shown in FIGS. 8 and 9 of the drawings, are adapted to engage inwardly projecting lugs 142 provided upon the individual cleats 28 of the track 26 to drive the track 26 about the suspension system 30.

It will be noted that the construction of the sprocket wheel 112 is a remarkably open construction by virtue of the fact that the primary elements thereof are constituted by the rings 130 and 132 and that the cantilever supports 126 are also of open configuration or construction. Therefore, when the sprocket 112 is submerged in mud or snow or other substance which would tend to become impacted on ordinary track drive means, a continuous circulation and propelling effect is achieved by virtue of the fact that the cantilever supports 126 serve as agitators which serve to propel and distribute any material which may infiltrate into the sprocket 112. In this manner, the clogging of detritus, snow, mud, or other materials which normally tend to prevent operation of conventional track laying sprockets by becoming impacted therein and between the sprockets themselves and the tracks, is eliminated and thus the sprockets are able to propel the tracks 26 through material which, when encountered by vehicles incorporating conventional drive sprockets, cause the immobilization of the same.

Furthermore, the suspension system constituted by the trailing arms 32 and the associated bogie support arms 52 mounted intermediate the extremities thereof and the associated bogie wheels 64 and 66 prevents dislodgement of the track 26 from operative engagement with the suspension system 30. This is attributable to the fact that the spring forces as generated by the compression springs 42 are equally imposed upon the trailing arms 32 and the associated bogie support arms 52. Therefore, when the track 26 is subjected to loads which cause deflection of portions thereof, said deflections are accommodated with great ease and dislodgement of the track from operative engagement with the bogie wheels 64 and 66 is prevented.

Moreover, the provision of a reversible bogie wheel combination to accommodate larger tracks which are necessary in power snow and other conditions renders the vehicle 10 much more flexible than ordinary track laying combat vehicles.

In addition, the arcuate configuration of the innermost rings 130 causes said rings to act as retracking devices. This is attributable to the fact that, when the lugs 142 on the track 26 tend to become dislodged from the sprocket 112, the arcuate rings 130 serve to urge the lugs 142 back into operative relationship with the sprocket 112.

I claim:
1. In a track supporting suspension system for a track laying vehicle having a body, the combination of: a plurality of trailing suspension arms pivotally mounted on opposite sides of said body, each of said arms having a spring seat on the rearward extremity thereof and incorporating a supporting stud at said rearward extremity; a bogie arm pivotally mounted on said stud intermediate its extremities, said bogie arm having an axle at its opposite extremities; a pair of track supporting bogie wheels mounted on each of the extremities of said bogie arm, each of said pairs of wheels being mounted on a single shaft encompassing an associated axle and said shaft being reversible with respect to said axle to locate the treads thereof on different centers with respect to said bogie arm; and compression means interposed between said body and said seat for urging said trailing arms and said bogie arm downwardly toward said track.

2. In a track supporting suspension system for a track laying vehicle having a body, the combination of: a plurality of trailing suspension arms pivotally mounted on opposite sides of said body, each of said arms having a spring seat on the rearward extremity thereof and incorporating a supporting stud at said rearward extremity; a bogie arm pivotally mounted on said stud intermediate its extremities, said bogie arm having an axle at its opposite extremities; a pair of track supporting bogie wheels mounted on each of the extremities of said bogie arm, said wheels of each pair being mounted on a common shaft with respect to an associated axle to locate the treads thereof on different centers with respect to said bogie arm; and compression means interposed between said body and said seat for urging said trailing arms and said bogie arm downwardly toward said track.

References Cited in the file of this patent

UNITED STATES PATENTS

| | | |
|---|---|---|
| 1,836,446 | Christie | Dec. 15, 1931 |
| 1,885,485 | Smyth | Nov. 1, 1932 |
| 2,003,528 | Best | June 4, 1935 |
| 2,113,545 | Herrington | Apr. 5, 1938 |
| 2,599,233 | Christie | June 3, 1952 |
| 2,704,942 | Koile | Mar. 29, 1955 |
| 2,800,031 | Schultz | July 23, 1957 |
| 2,838,344 | Eyb | June 10, 1958 |
| 2,857,169 | Spannhake | Oct. 21, 1958 |
| 2,859,068 | Larsson | Nov. 4, 1958 |

FOREIGN PATENTS

| | | |
|---|---|---|
| 200,217 | Switzerland | Dec. 16, 1938 |